(No Model.)
O. E. MORSE & E. H. BRUNDAGE.
COMBINATION TOOL.
No. 552,853. Patented Jan. 7, 1896.
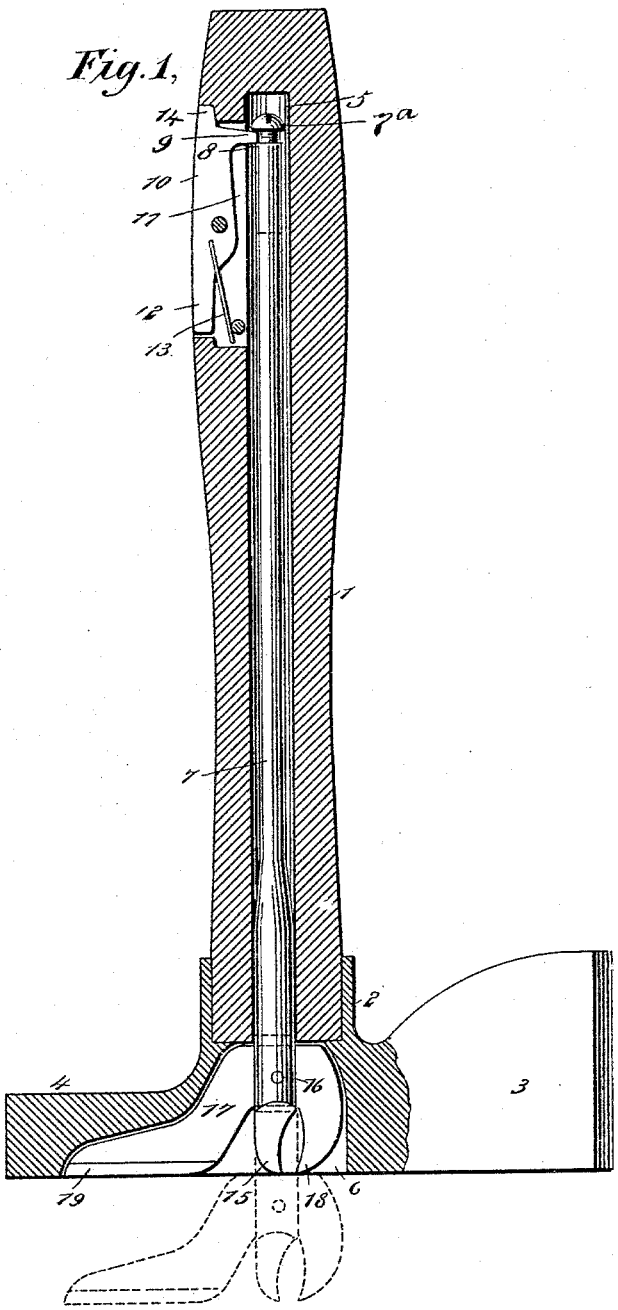
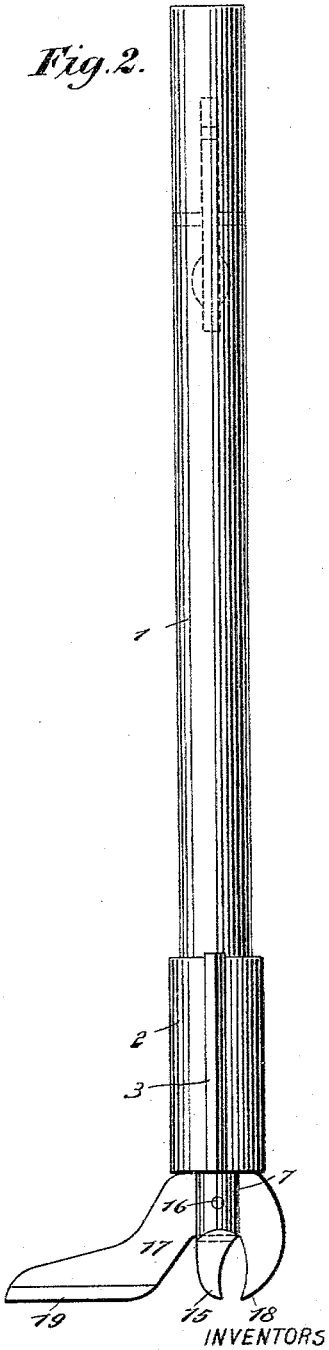
Witnesses
Edward Thorpe
J. B. Saplonger
INVENTORS
O. E. Morse
E. H. Brundage
BY
Munn & Co.
ATTORNEYS

UNITED STATES PATENT OFFICE.

OSCAR ERNEST MORSE AND EVERETT HIRAM BRUNDAGE, OF DILLON, MONTANA.

COMBINATION-TOOL.

SPECIFICATION forming part of Letters Patent No. 552,853, dated January 7, 1896.

Application filed April 12, 1895. Serial No. 545,500. (No model.)

*To all whom it may concern:*

Be it known that we, OSCAR ERNEST MORSE and EVERETT HIRAM BRUNDAGE, of Dillon, in the county of Beaver Head and State of Montana, have invented certain new and useful Improvements in Combination-Tools, of which the following is a full, clear, and exact description.

This invention relates to certain improvements in that class of combination-tools wherein are combined a hatchet, hammer, and nail-puller arranged upon a suitable handle, so as to be readily applied for use; and the object of the invention is to provide a device of this character of a simple, inexpensive and efficient construction which shall present certain features of novelty and advantages for use over other similar devices heretofore employed, all as will be hereinafter fully set forth.

The novel features of the invention will be carefully defined in the claim.

Reference is to be had to the accompanying drawings, forming a part of this specification, in which similar figures of reference indicate corresponding parts in both the views.

Figure 1 is an axial longitudinal section taken through the head and handle of the device, showing the nail-pulling device in its closed position; and Fig. 2 is an edge view of the combination-tool, showing the nail-pulling device arranged in position for use.

In the views, 1 represents the handle of the combination-tool, which may be formed of wood of any preferred style and size—such, for example, as is commonly used for hatchets and hammers—and 2 represents the head of the tool formed with a socket to receive the handle 1 and provided at one side with a blade 3 having a cutting-edge and at its opposite side with a hammer-head 4 adapted for driving nails and the like.

The handle 1 is formed with a longitudinal axial bore 5 of cylindrical cross-section, and the head 2 of the tool is formed with a recess 6 extending through it and corresponding to the bore 5, said recess being elongated, as clearly seen in Fig. 1.

The nail-pulling device is provided with a stem or shank 7 of circular cross-section having a reduced upper portion, so as to be adapted to slide freely in the bore 5 of the handle 1, and said shank or stem 7 is provided at its upper extremity with a screw $7^a$, the recess 8 thereby formed between the top of the shank and the head of the screw being adapted to receive a tooth 9 formed upon one end of a dog 10 pivoted in a lateral recess 11 in the hammer-handle 1, the opposite end 12 of said dog being arranged in position to be engaged readily by the fingers of the operator, and being provided with a spring 13 engaging an abutment in the handle and adapted to hold the tooth 9 normally in position to engage the recess 8 in the shank 7. At its opposite end, adjacent to the tooth 9, the dog 10 is formed with a reduced portion 14 adapted to engage a stop formed in the handle 1 to limit the movement of said dog. The screw $7^a$ at the upper end of the shank 7 is adapted to engage the tooth 9 of the dog 10 and push the same outwardly when the nail-pulling device is inserted in the recess in the tool. At its opposite end the shank 7 is provided with a jaw 15 adapted to engage the nail to be removed at one side thereof, and above said jaw 15 the shank is formed with a transverse aperture through which extends the pivoted member 17 of the nail-pulling device, being pivoted to the shank 7, as indicated at 16, and provided with a jaw 18 adapted to engage the nail to be removed at the opposite side thereof from said jaw 15. These jaws 15 and 18 are provided with sharpened extremities and concaved inner faces in order that they may the better engage and grip the nail, as clearly indicated in the drawings.

The pivoted member 17 of the nail-pulling device is formed at its end opposite the jaw 18 with a shoe 19 adapted to engage the surface of the article wherein the nail is driven, said shoe being formed with a widened surface, as indicated, in order that it may not sink into the surface while the nail is being removed.

In operation when it is desired to use merely the hammer or blade of the tool the nail-pulling device will be inserted in the recess of the tool and held in place therein by the dog 10, which forms a latch for this purpose, and when it is desired to use the nail-pulling device the dog 10 is pressed so that its tooth is disengaged from the notch in the shank, whereupon the nail-pulling device will drop down to the position indicated in dotted lines in Fig. 1, after which it is turned one-fourth way around, so that the shoe 19 projects at right angles to the blade 3 of the tool, whereby said shoe is prevented from slipping back into its recess while in use. The jaws 15 and 18 are thereupon inserted in the wood at opposite sides of the head of the nail to be drawn, and by using the shoe 19 as a fulcrum the tool-handle 1 is employed as a lever to pry or draw the nail from the wood.

The upper end of the shank 7 is of a less size than bore 5 in handle 1, wherein said shank plays, in order that the said shank may be freely movable in said bore, and the lower end of said shank is of an enlarged diameter adapted to snugly fit the lower end of said bore, so that when the nail-pulling device is inclosed and held in the recess in the head 2 it will be prevented from rattling about when the device is used for driving nails or cutting purposes. The shank 7 is also of a length substantially equal to the length of the handle 1, and serves to strengthen said handle, as the same would be weakened otherwise by the formation of the bore therein. The shank 7 and bore 5 are both made circular in cross-section in order that when desired the former may be freely turned in the latter.

The screw $7^a$ forms a rounded head for the shank 7, adapted when the said shank is inserted in the bore 5 to slip over the tooth 9 of the latch and press the same back, so that the shank is automatically locked in position when inserted. The screw $7^a$ also forms a convenient means for adjusting the shank so that its notch will at all times be engaged by said tooth 9 in such a way as to hold said shank in its uppermost position, so that no rattling of the nail-pulling device is permitted.

Having thus described our invention, we claim as new and desire to secure by Letters Patent—

A combination tool, comprising a head and a handle, said head being formed with a recess, a nail pulling device adapted to be inclosed in the recess and provided with a shank having a jaw at one end and a second jaw pivoted to said shank and provided at its extremity with a shoe, and a latch adapted to engage the shank of the nail pulling device and hold the same in its inclosed position, said nail-pulling device being adapted to be rotated, when withdrawn from said recess, to bring it out of coincidence with said recess, substantially as set forth.

OSCAR ERNEST MORSE.
EVERETT HIRAM BRUNDAGE.

Witnesses:
H. D. PICKMAN,
EDWIN NORRIS.